Oct. 8, 1929.  R. F. WALTERS  1,731,206
SEPARABLE FASTENER AND FASTENER INSTALLATION
Filed July 9, 1927
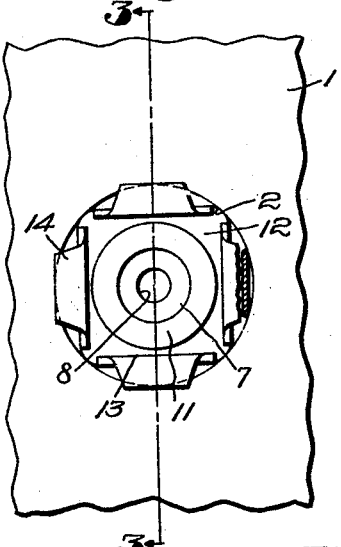
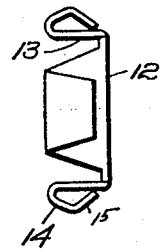
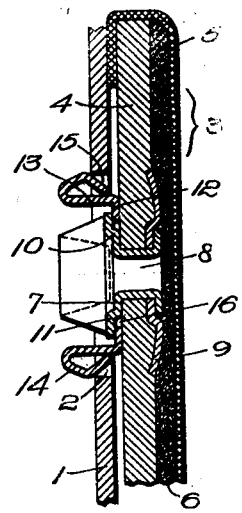
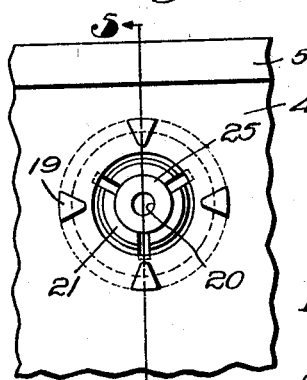
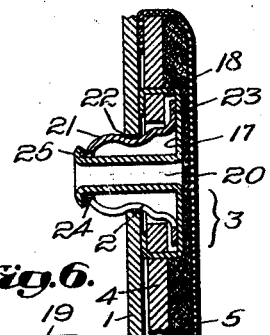
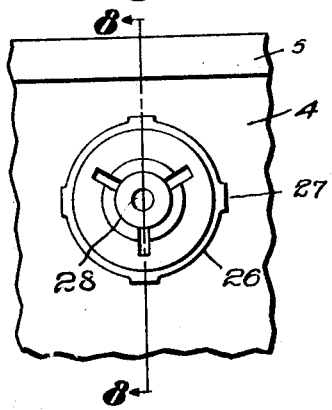
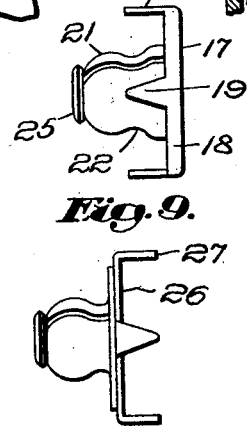
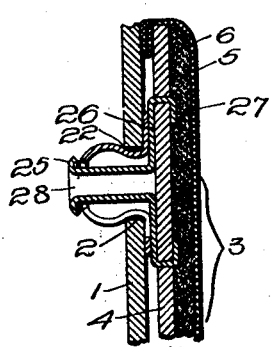
Inventor:
Rollo F. Walters
by Emery, Booth, Janney & Varney
Attys.

Patented Oct. 8, 1929

1,731,206

UNITED STATES PATENT OFFICE

ROLLO F. WALTERS, OF DETROIT, MICHIGAN, ASSIGNOR, BY MESNE ASSIGNMENTS, TO UNITED-CARR FASTENER CORPORATION, OF CAMBRIDGE, MASSACHUSETTS, A CORPORATION OF MASSACHUSETTS

SEPARABLE FASTENER AND FASTENER INSTALLATION

Application filed July 9, 1927. Serial No. 204,553.

My invention aims to provide improvements in separable fasteners and fastener installations.

In the drawings, which illustrate three embodiments of my invention:—

Figure 1 is an elevation viewing the installation from the inside thereof and showing one form of stud unit;

Fig. 2 is a side elevation of the stud part, shown in Fig. 1, before being assembled to its carrying medium;

Fig. 3 is a section taken on the line 3—3 of Fig. 1;

Fig. 4 is an inside elevation of a portion of a stud-carrying medium showing a second form of stud unit partly in elevation and partly in dotted lines;

Fig. 5 is a section on the line 5—5 of Fig. 4, the frame part being added to complete a cross-section through the installation;

Fig. 6 is a side elevation of the stud unit, shown in Figs. 4 and 5;

Fig. 7 is a view similar to that shown in Fig. 4 but showing the third form of stud unit;

Fig. 8 is a section on the line 8—8 of Fig. 7, the frame part being added to complete the installation; and Fig. 9 is a side elevation of the stud unit, shown in Figs. 7 and 8.

Referring to the drawings, I have shown various forms of stud units, made according to my invention, and, for the purpose of illustration only, being used in connection with securing an upholstered backing to a frame part. These stud units are particularly useful where it is desirable to secure upholstery to all metal frames.

Referring first to the embodiment of my invention, illustrated in Figs. 1 through 3, I have shown, for the purpose of illustration only, a portion of a relatively thin sheet of metal which I will call the frame part 1. While any suitable type of socket member may be attached to this frame part 1, I prefer to provide a hole 2 therein into which the head of a stud may be pressed. The upholstered part 3, shown in Fig. 3, for application to the frame part 1 may be of any suitable form. However, I have shown an upholstered part having a backing 4, of cardboard or the like, to which the stud units are secured and a covering of flexible material 5, such as cloth, leather or the like, for concealing the stud unit and providing a finish to the installation. If desirable, a padding 6 may be used between the backing 4 and the covering 5, as shown in Fig. 3. The stud unit which I have shown secured to the backing 4, for securing the upholstered part to the frame, as indicated in Figs. 1 and 3, includes an attaching part having a plate portion 7 seated against the inner face of the backing 4 and from this plate 7 extends a tubular rivet portion 8, which passes through an opening in the backing 4 and is clenched against a suitable metallic washer 9. Extending away from the plate 7 in the opposite direction from the rivet 8, I have provided a relatively short tubular portion 10 from the outer end of which extends a flange 11 parallel with the plate portion 7. The stud part of the unit is pressed from a single piece of metal and has a base portion 12 from the periphery of which extend upwardly, outwardly and downwardly a plurality of resilient fingers 13. These fingers are so proportioned that they provide an enlarged portion or head 14 for the stud part and a sloping neck portion 15.

When the stud unit is attached to the upholstered part 3, as shown in Fig. 3, the tubular portion 10 of the attaching part extends through an opening 16 in the base portion 12 of the stud part and the flange extends outwardly over the base portion, so that the stud part cannot be separated from the attaching part. The opening 16 in the base 12 of the stud part is somewhat larger in diameter than the cross-sectional area of the tubular portion 10, as shown in Fig. 3, thereby permitting limited shifting movement of the stud part, relative to the attaching part and the upholstered part for alignment with the hole or stud-receiving aperture 2 in the frame part 1.

In practice, the upholstered part is provided with a number of these stud units spaced around and adjacent to the periphery for holding it to the frame part, and it has been found that the manufacturing tolerances are such that it would be impracticable to provide fixed studs upon the upholstered part for engagement with corresponding socket means provided in the frame part, especially when the frame part is pressed into form after the holes are punched. Applicant's stud units have been provided with stud parts which may shift transversely relative to the backing, so that they may be properly aligned with and pressed into apertures in the frame part, as illustrated in Figs. 1 and 3 of the drawings.

In Figs. 4, 5 and 6, I have illustrated a second form of stud unit used in connection with securing an upholstered part 3 to the frame part 1. This unit includes an attaching part having a plate portion 17 corresponding with the plate portion 7 of the attaching part, shown in Figs. 1 and 3. At the periphery of the plate portion 17, I have provided an annular wall 18 for spacing the plate portion 17 away from the face of the backing 4, as indicated in Fig. 5, the purpose of which will be more fully hereinafter described. This plate portion 17 is attached to the backing 4 between the padding and the covered face of the backing by a plurality of attaching prongs 19 extending from the free end of the annular wall 18 through the backing. The free ends of the prongs 19 are upset and clenched against the inner face of the backing (Figs. 4 and 5). A relatively long tubular rivet portion 20 is pressed from the plate 17 and it extends, in this instance, in the same direction as the attaching prongs.

The stud part of the stud unit is of the usual resilient type having a head 21, a neck 22 and base portion 23. The base portion 23, as illustrated in Fig. 5, is located in the space provided by the peripheral wall 18, and the rivet 20 extends through an opening 24 in the head of the stud where its free end is upset to provide a flange 25 for holding the stud part in assembly with the attaching part. The base 23 of the stud part is of a somewhat smaller cross-sectional area than the cross-sectional area provided within the peripheral wall 18 and the aperture 25 in the head of the stud is somewhat larger in cross-sectional area than the cross-section of the rivet portion 10, thereby permitting transverse shifting of the stud part in a single plane, in all directions, relative to the attaching part and the upholstered part 3 for alignment with the aperture 2 in the frame part 1, for the purpose described in connection with Figs. 1, 2 and 3.

The third embodiment of stud unit, as illustrated in Figs. 7, 8 and 9, comprises an attaching part having a plate portion 26 corresponding to the plate portions 7 and 17 of the above described stud units. This plate portion 26 is adapted to be secured to the inner face of the backing 4, as illustrated in Fig. 8, by the attaching prongs 27. The prongs 27 pass through the backing 4 and are clenched against the opposite face thereof before the padding 6 and covering 5 are assembled with the backing. The stud member which forms a part of my third form of stud unit is substantially the same as the one described in connection with Figs. 4 through 6, except for the necessary and obvious changes in proportions, because of its being attached to a different side of the backing part. The attaching part of this stud unit is also provided with a tubular rivet portion 28 for securing the stud part in shiftable relation to the attaching part, in substantially the same manner as described in connection with Figs. 4 through 6, except that, in the present embodiment, the tubular rivet portion extends from the plate 26 in the opposite direction from the attaching prongs 27.

While I have shown and described several embodiments of my invention, I do not wish to be limited thereto, my invention being best defined in the following claims.

Claims:

1. A fastener stud unit comprising, in combination, an attaching part having means for securing it to a support, a stud part, rivet means extending from one part and engaging the other part to hold the said parts in assembly and means providing an aperture in one of said parts through which a portion of said rivet means passes, said aperture being of larger cross-sectional area than the cross-sectional area of the rivet portion where it passes through the aperture thereby permitting limited transverse shifting of one part relative to the other part in all lateral directions.

2. A fastener stud unit comprising, in combination, an attaching part and a stud part, said attaching part having a plate portion, attaching means extending therefrom for securing the plate portion to a suitable carrying medium and other attaching means extending at a right angle from said plate portion through an aperture of larger cross-sectional area than the cross-sectional area of the said other attaching means, said aperture being provided in the stud part, said other attaching means securing said stud part and attaching part together and permitting lateral shifting of one part relative to the other part.

3. In a separable fastener installation, a frame part, a part for application to said frame part and snap fastening means securing said parts together, said fastening means comprising socket means presented by the frame part, a stud attaching part rigidly secured to said second mentioned part, a stud-holding portion extending from said attaching part toward said socket means and a stud part having an aperture of substantially larger cross-sectional area than the cross-sectional area of the stud-holding portion where it passes through the aperture whereby said stud part is loosely assembled to said stud-holding portion, and is shiftable in all directions in a single plane for alignment with said socket means.

4. In a separable fastener installation, a frame part, a part for application to said frame part and snap fastening means securing said parts together, said fastening means comprising socket means presented by the frame part, a stud attaching plate part secured in fixed relation against one face of the second mentioned part, a rivet portion exending from said plate part toward the socket means and a stud part having an aperture of substantially larger cross-sectional area than the cross-sectional area of the rivet portion where it passes through the aperture whereby said stud part is loosely assembled to said rivet part, and is shiftable transversely to the second mentioned part for alignment with said socket means.

5. In a separable fastener installation, a frame part, a part for application to said frame part and snap fastening means securing said parts together, said fastening means comprising socket means presented by the frame part, and a shiftable stud unit secured to the part to be secured to the frame part, said stud unit comprising an attaching part having means for securing it in fixed relation to the part to be secured to the frame part and also presenting a tubular rivet portion and a stud part having an aperture of substantially larger cross-sectional area than the cross-sectional area of the rivet portion where it passes through the aperture whereby said stud part is loosely assembled with said attaching part by said rivet portion, and is shiftable in all directions transverse to the axis of the rivet portion.

In testimony whereof, I have signed my name to this specification.

ROLLO F. WALTERS.